United States Patent Office 3,320,260
Patented May 16, 1967

3,320,260
BENZOCYCLOPENTAINDOLIZINES AND
DIBENZINDOLIZINES
Richard E. Brown, Hanover, and Robert I. Meltzer,
Rockaway, N.J., assignors to Warner-Lambert Pharmaceutical Company, Morris Plains, N.J., a corporation of
Delaware
No Drawing. Filed Apr. 3, 1964, Ser. No. 357,275
23 Claims. (Cl. 260—287)

This invention relates to a new and novel class of heterocyclic compounds. More particularly, this invention relates to novel substituted indolizines of the formula:

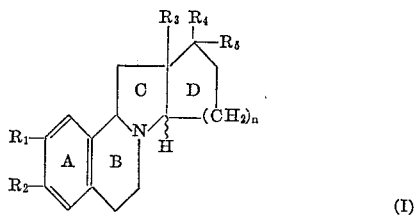

(I)

wherein $R_1$ and $R_2$ each represents hydrogen, hydroxy, or lower alkoxy such as methoxy or methylene dioxy; $R_3$ represents hydrogen or lower alkyl such as methyl, ethyl, propyl, isopropyl, butyl or isobutyl; $R_4$ represents hydrogen, lower alkyl such as methyl, ethyl, propyl, isopropyl, butyl or isobutyl; $R_5$ represents hydrogen, —$COOR_6$, in which $R_6$ may be hydrogen, or lower alkyl or

or $R_4$ and $R_5$ taken together with the carbon atom to which they are attached represent a keto radical such as

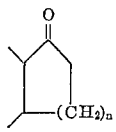

or a cyclic ketal radical such as

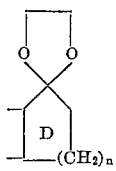

and $n$ may be 1 or 2.

The symbols $R_1$, $R_2$, $R_3$, $R_4$, $R_5$, $R_6$ and $n$ as used hereinafter have the same meaning as defined.

This invention also includes within its scope a novel process for the production of these compounds.

The compounds of this invention contain a fused tetracyclic ring system in which a substituted aromatic ring A is fused to the 7–8 face of indolizine nucleus of the formula

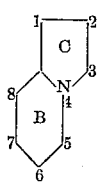

The numbering of the fused ring system is indicated below

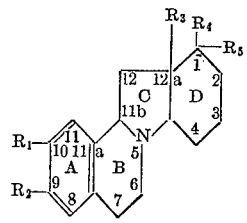

and

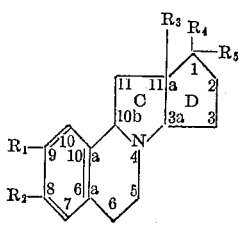

Exemplary of such indolizines are:

2,3,3a,5,6,10b,11,11a-octahydro-8-methoxy-1H-benzo [g] cyclopenta [b] indolizine
2,3,3a,5,6,10b,11,11a-octahydro-8-methoxy-11a-methyl-1H-benzo [g] cyclopenta [b] indolizine
2,3,3a,5,6,10b,11,11a-octahydro-8-9-dimethoxy-11a-methyl-1-carbethoxy-cyclopenta [b] indolizine
2,3,3a,5,6,10b,11,11a-octahydro-8-hydroxy-1H-benzo [g] cyclopenta [b] indolizine
2,3,3a,5,6,10b,11,11a-octahydro-8-hydroxy-11a-methyl-1H-benzo [g] cyclopenta [b] indolizine
2,3,3a,5,6,10b,11,11a-octahydro-8-hydroxy-11a-methyl-1-carboxy-1H-benzo [g] cyclopenta [b] indolizine
2,3,3a,5,6,10b,11,11a-octahydro-8-methoxy-11a-methyl-1H-benzo [g] cyclopenta [b] indolizine-1-one
2,3,3a,5,6,10b,11,11a-octahydro-8-hydroxy-11a-methyl-1H-benzo [g] cyclopenta [b] indolizine-1-one
1,2,3,4,4a,6,7,11b,12,12a-decahydro-9-methoxy-dibenz [b,g] indolizine
1,2,3,4,4a,6,7,11b,12,12a-decahydro-9-methoxy-12a-methyl-dibenz [b,g] indolizine
1,2,3,4,4a,6,7,11b,12,12a-decahydro-9-10-dimethoxy-12a-methyl-1-carbethoxy-dibenz [b,g] indolizine
1,2,3,4,4a,6,7,11b,12,12a-decahydro-9-hydroxy-dibenz [b,g] indolizine
1,2,3,4,4a,6,7,11b,12,12a-decahydro-9-hydroxy-12a-methyl-dibenz [b,g] indolizine
1,2,3,4,4a,6,7,11b,12,12a-decahydro-9-hydroxy-12a-methyl-1-carboxy-dibenz [b,g] indolizine
1,2,3,4,4a,6,7,11b,12,12a-decahydro-9-methoxy-12a-methyl-dibenz [b,g] indolizine-1-one
1,2,3,4,4a,6,7,11b,12,12a-decahydro-9-hydroxy-12a-methyl-dibenz [b,g] indolizine-1-one The new and novel compounds of this invention resemble the steroids structurally and can be considered as C-nor-8-azasteroids and as such exhibit significant steroidal like properties. These properties include, for example, estrogenic, anabolic, and so on, and are, therefore, useful in the treatment of various endocrine disorders. They also exhibit other pharmacological properties, notably on the cardiovascular system such as hypotensive effects. In addition, they are important intermediates toward the preparation of other substituted indolizine compounds. Thus, for example, ring A wherein $R_1$ is hydrogen and $R_2$ is methoxy may be reduced employing alkali metals such as sodium in the presence of an alcohol such as ethanol in liquid ammonia to give, after hydrolysis with a dilute mineral acid such as hydrochloric, a compound of the formula:

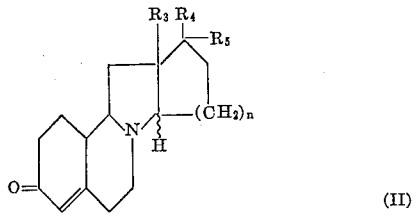

(II)

or those compounds wherein $R_4$ and $R_5$ taken together is a ketone group may be reacted with acetylene to give an ethynyl alcohol of the formula:

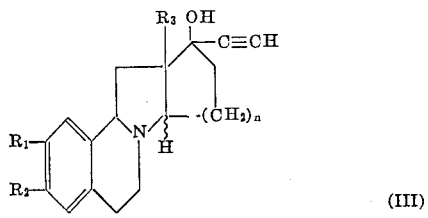

(III)

We have found that compounds of this invention may be produced according to the following reaction sequence. The preparation of an intermediate lactam of the formula:

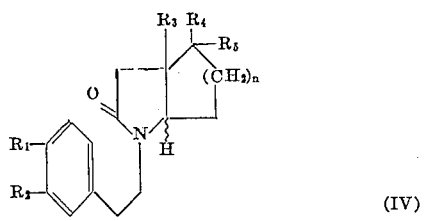

(IV)

is accomplished by either of two methods. In the first method, substituted β-phenethylamines of the formula:

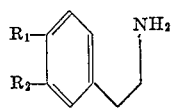

and cycloalkanone-2-acetic acids or the corresponding esters of the formula:

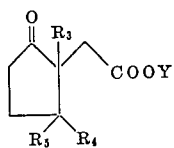

in which Y may be hydrogen, lower alkyl such as methyl, ethyl, or propyl; or aralkyl such as benzyl are reacted in equivalent quantities in a high boiling inert solvent such as xylene or toluene. Under such conditions, there is formed an unsaturated lactam of the Formula V below:

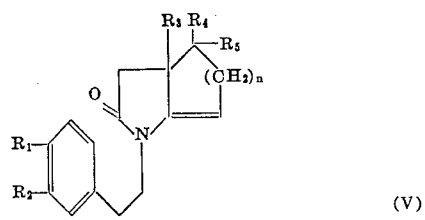

(V)

Such an intermediate can be catalytically reduced as desired subsequently to give a saturated lactam such as IV, or it can be cyclized to give a substituted indolizine of the Formula VI:

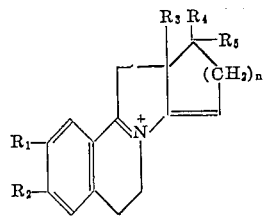

(VI)

Examplary of such indolizines are:

1,2,5,6,11,11a-hexahydro-8-methoxy-11a-methyl-1-oxo-benzo[g]cyclopenta[b]indolizinium perchlorate
2,3,6,7,12,12a-hexahydro-9-methoxy-12a-methyl-1-oxo-1-H-dibenz[b.g]indolizinium bromide
1,2,5,6,11,11a-hexahydro-8-methoxy-11a-methyl-1-carbethoxy-benzo[g]cyclopenta[b]indolizinium perchlorate
2,3,6,7,12,12a-hexahydro-9-methoxy-12a-methyl-1-carbethoxy-1H-dibenz[b,g]indolizinium perchlorate and the like.

Agents which may be employed to effect this cyclization, for example, phosphorous oxychloride and the like. Reduction of indolizines such as VI with gaseous hydrogen in the presence of a catalyst such as palladium on carbon or complex alkali metal hydrides such as sodium or potassium borohydrides yield the desired saturated indolizines of this invention. Alternately the lactam V may be catalytically reduced with gaseous hydrogen in the presence of palladium on carbon or other suitable hydrogenation catalyst to form a saturated lactam corresponding to the Formula IV. Such lactams may then be cyclized to give a substituted indolizine of the structure

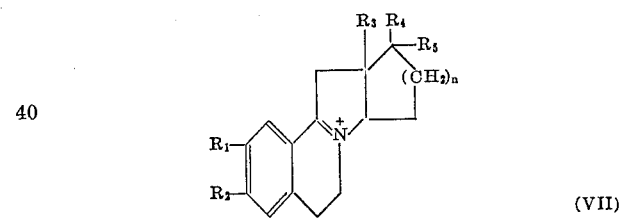

(VII)

Exemplary of indolizines such as VII are:

1,2,3,3a,5,6,11,11a-octahydro-8-methoxybenzo[g]cyclopenta[b]indolizinium bromide
1,2,3,3a,5,6,11,11a-octahydro-8-methoxy-11a-methyl-benzo[g]cyclopenta[b]indolizinium bromide
1,2,3,3a,5,6,11,11a-octahydro-8-methoxy-11a-methyl-1-carbethoxy-benzo[g]cyclopenta[b]indolizinium bromide
1,2,3,3a,5,6,11,11a-octahydro-8-hydroxy-benzo[g]cyclopenta[b]indolizinium bromide
1,2,3,3a,5,6,11,11a-octahydro-8-hydroxy-11a-methyl-benzo[g]cyclopenta[b]indolizinium bromide
1,2,3,3a,5,6,11,11a-octahydro-8-hydroxy-11a-methyl-1-carboxybenzo[g]cyclopenta[b]indolizinium bromide
1,2,3,3a,5,6,11,11a-octahydro-8-methoxy-11a-methyl-1-oxobenzo[g]cyclopenta[b]indolizinium bromide
1,2,3,3a,5,6,11,11a-octahydro-8-hydroxy-11a-methyl-1-oxobenzo[g]cyclopenta[b]indolizinium bromide
2,3,4,4a,6,7,12,12a-octahydro-9-10-dimethoxy-1H-dibenz[b,g]indolizinium bromide
2,3,4,4a,6,7,12,12a-octahydro-9-methoxy-12a-methyl-1H-dibenz[b,g]indolizinium bromide
2,3,4,4a,6,7,12,12a-octahydro-9-methoxy-12a-methyl-1-carbethoxy-1H-dibenz[b,g]indolizinium bromide
2,3,4,4a,6,7,12,12a-octahydro-9,10-dihydroxy-1H-dibenz[b,g]indolizinium bromide
2,3,4,4a,6,7,12,12a-octahydro-9-hydroxy-12a-methyl-1H-dibenz[b,g]indolizinium bromide
2,3,4,4a,6,7,12,12a-octahydro-9-hydroxy-12a-methyl-1-carboxy-1H-dibenz[b,g]indolizinium bromide 2,3,4,4a,6,7,12,12a-octahydro-9-methoxy-1-oxo-1H-12a-methyl-dibenz[b,g]indolizinium bromide 2,3,4,4a,6,7,12,12a-octahydro-9-hydroxy-1-oxo-1H-12a-methyl-dibenz[b,g]indolizinium bromide and the like.

These indolizines may then be further reduced to compounds which correspond to structural Formula I. Such reduction reactions may be carried out by employing any one of the reduction methods such as the use of gaseous hydrogen in the presence of a catalyst such as palladium on carbon or of complex alkali metal hydrides such as sodium borohydride.

The reaction sequence when carried out according to the above procedures leads predominantly to one of the two possible configurations about the C-D ring fusion. By employing the following alternate condensation method we can obtain both of these steric configurations about this ring junction thereby giving two isomers. In this second procedure, the starting substituted β-phenethyl-amine and cycloalkanone-2-acetic acid or ester are subjected to a reductive condensation carried out in a suitable solvent, such as methanol, ethanol or isopropanol over a hydrogenation catalyst such as palladium on carbon. Under these reaction conditions, there is formed a mixture of two isomeric amino acids if cycloalkanone-2-acetic acid is one of the starting materials or two isomeric amino esters if the corresponding ester is employed as the starting material. The isomeric amino acids correspond to the formula:

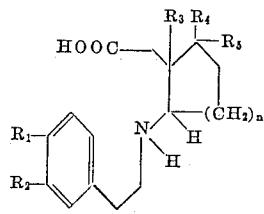

(VIII)

and

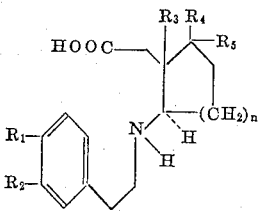

(IX)

Exemplary of such amino acids are:

cis and trans 2-carboxymethyl-N-(m-methoxyphenethyl)-cyclopentylamine cis and trans 2-methyl-2-carboxymethyl-N-(m-methoxyphenethyl)-cyclopentylamine cis and trans 2-methyl-2-carboxymethyl - 3 - carboxy-N-(m-methoxyphenethyl)-cyclopentylamine cis and trans 2 - methyl-2 - carboxymethyl-3-keto-N-(m-methoxyphenethyl)-cyclopentylamine cis and trans 2-methyl-2-carboxymethyl-N-(3,4-dimethoxyphenethyl)-cyclohexylamine cis and trans 2-methyl-2-carboxymethyl-N-(m-methoxyphenethyl)-cyclohexylamine cis and trans 2-methyl-2-carboxymethyl-3-carboxy-N-(m-methoxyphenethyl)-cyclohexylamine cis and trans 2-methyl-2 - carboxymethyl-3-keto-N-(m-methoxyphenethyl)-cyclohexylamine and the like.

These isomeric amino acids may be readily separated by taking advantage of the fact that the cis isomer undergoes cyclization to give the earlier-described saturated lactam IV, under much milder conditions than occurs with the trans isomer. Thus, for example, in some cases, the cis isomer actually cyclizes to the lactam spontaneously during the reductive condensation step. In those cases in which a mixture of the amino acids is obtained from the reductive condensation, it is usually sufficient to merely dissolve the amino acid mixture by heating in an inert solvent such as acetonitrile or isopropanol to bring about the cyclization of the cis amino acid. The trans amino acid IX is recovered in pure form by cooling the solution and filtering, and the cis compound can then be obtained pure in the lactam form by concentrating the solution to dryness and washing the residue with water to remove residual traces of trans amino acid.

The pure cis lactam and trans amino acid can then be cyclized in the usual way with an appropriate cyclization reagent, such as phosphorous oxychloride, to afford the two isomeric substituted indolizines corresponding to structure VII. Alternatively, the pure trans amino acid may be converted to the trans lactam corresponding to structure IV by heating to its melting point, and this product then cyclized to the indolizine corresponding to structure VII.

These indolizines may exist in the form of the quaternary salt VII, or may be converted to the free base by treatment of the quaternary salt with an aqueous alkali such as sodium hydroxide, ammonium hydroxide and the like. Such free bases have the Formula X:

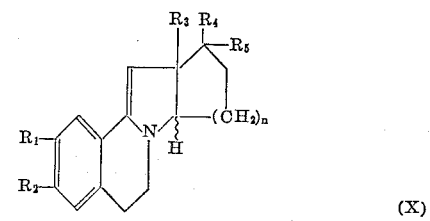

(X)

Exemplary of indolizines such as X are:

2,3,3a,5,6,11a-hexahydro-8-methoxy-1H-benzo[g]cyclopent[b]indolizine 1,2,3,4,4a,6,7,12a-octahydro-9-methoxydibenz[b,g]indolizine 2,3,3a,5,6,11a-hexahydro-8-methoxy-1-oxo-11a-methyl-1H-benzo[g]cyclopent[b]indolizine 1,2,3,4,4a,6,7,12a-octahydro-9-methoxy-1-oxo-12a-methyl-dibenz[b,g]indolizine 2,3,3a,5,6,11a-hexahydro-8-methoxy-1-carbethoxy-11a-methyl-1H-benzo[g]cyclopent[b] indolizine 1,2,3,4,4a,6,7,12a-octahydro-9-methoxy-1-carbethoxy-12a-methyldibenz[b,g]indolizine and the like.

The following examples are given in order to further illustrate the present invention. All temperatures given are in the centigrade scale.

EXAMPLE 1

*Cis and trans-2-carboxymethyl-N-(m-methoxyphenethyl)-cyclohexylamine*

A mixture of 1.51 grams (10 mmoles) of m-methoxyphenethylamine, 1.56 grams (10 mmoles) of cyclohexanone-2-acetic acid, 0.5 gram of 10% palladium on charcoal catalyst and 50 ml. of ethanol is hydrogenated at ambient temperature and 50 p.s.i. pressure until hydrogen absorption is complete (ca. 16 hours). The catalyst is filtered, and the solvent removed by vacuum distillation. The white solid residue is warmed with 50 ml. isopropanol, cooled, diluted with a little ether and filtered after one hour to give pure cis 2-carboxymethyl-N-(m-methoxyphenethyl)-cyclohexylamine as white crystals, M.P. 133–4° which may be recrystallized from water. The filtrate is concentrated to dryness and the white solid residue is triturated with water and filtered to give another small amount of the cis acid. The filtrate is concentrated to dryness and triturated with acetone to give pure trans 2-carboxymethyl-N-(m - methoxyphenethyl)-cyclohexylamine as white crystals, M.P. 134–5°. Thin layer chromatography using silica gel as the stationary phase and a 75–25 mixture of methanol-acetone as the moving phase (iodine as developing agent) shows the cis and trans amino acids as sharp spots of $R_f=0.4$ and 0.5, respectively.

EXAMPLE 2

*Cis-2,3,4,4a,6,7,12,12a-octahydro-9-methoxy-1H-dibenz[b,g]indolizinium bromide*

A slurry of 7.4 grams of cis 2-carboxymethyl-N-(m-methoxyphenethyl)cyclohexylamine in 300 ml. benzene containing 50 ml. of phosphorous oxychloride is refluxed for two hours. The mixture is concentrated under reduced pressure to a yellow oil. The oil is dissolved in 200 ml. of water, chopped ice is added, and the mixture is made basic with 5% sodium hydroxide solution. The precipitated oil is extracted with ether. The ether is dried over magnesium sulfate, and dry hydrogen bromide is passed in. The precipitated yellow oil crystallizes on rubbing with isopropanol. The yellow solid is recrystallized from isopropanol to give cis-2,3,4,4a,6,7,12,12a-octahydro - 9 - methoxy-1H-dibenz[b,g]indolizinium bromide as yellow crystals, M.P. 175°–8°. The quaternary perchlorate can be prepared by treating the bromide with dilute perchloric acid, and melts at 116–18° after recrystallization from ethanol.

The quaternary salt can be dissolved in water and made basic by addition of dilute alkali to give a precipitate of the free base, cis-1,2,3,4,4a,6,7,12a-octahydro-9-methoxy-dibenz [b,g] indolizine as a yellow oil.

EXAMPLE 3

*Trans-2,3,4,4a,6,7,12,12a-octahydro-9-methoxy-1H-dibenz[b,g]indolizinium perchlorate*

In the same way as described in Example 2, 3.0 grams of trans - hexahydro-1-(m-methoxyphenethyl)-2-indolinone in a mixture of 150 ml. of benzene and 30 ml. of phosphorous oxychloride are cyclized to give trans-2,3,4,4a,6,7,12,12a - octahydro - 9-methoxy-1H-dibenz[b,g] indolizinium perchlorate, as white plates, M.P. 182–3° after recrystallization from ethanol.

The free base, trans - 1,2,3,4,4a,6,7,12a-octahydro-9-methoxydibenz[b,g]indolizine is obtained as white crystals, M.P. 92–4°, in the same way as described in Example 2.

EXAMPLE 4

*Trans-2,3,4,4a,6,7,12,12a-octahydro-9-hydroxy-1H dibenz[b,g]indolizinium bromide*

A solution of 2.7 grams of trans-2,3,4,4a,6,7,12,12a-octahydro - 9-methoxy-1H-dibenz[b,g]indolizinium perchlorate in 10 ml. of acetone is poured into 200 ml. of 5% sodium hydroxide solution. The precipitated solid is extracted with 2 portions of 25 ml. each of 48% hydrobromic acid, and the combined hydrobromic acid solutions are refluxed for 6 hours. This solution is concentrated to dryness under reduced pressure and the oily residue is crystallized by rubbing with isopranol. The crude solid is filtered and recrystallized from n-propanol to give trans - 2,3,4,4a,6,7,12,12a - octahydro-9-hydroxy-1H-dibenz[b,g]indolizinium bromide, as a white powder, M.P. 269–71°.

EXAMPLE 5

*Cis-2,3,4,4a,6,7,12,12-octahydro-9-hydroxy-1H-dibenz[b,g]-indolizinium bromide*

A solution of 5.0 grams of cis-2,3,4,4a,6,7,12,12a-octahydro-9-methoxy-1H-dibenz[b,g]indolizinium bromide in 80 ml. of 48% hydrobromic acid is refluxed for 6 hours. The solution is concentrated to a solid which is recrystallized from methanol to give cis-2,3,4,4a,6,7,12,12a-octahydro-9-hydroxy-1H-dibenz[b,g]indolizinium bromide as white crystals, M.P. 277–9°.

EXAMPLE 6

*Trans - 2 - carboxymethyl-N-(m-methoxyphenethyl)cyclopentylamine and cis - 3,3a,4,5,6,6a - hexahydro-1-(m-methoxyphenethyl)cyclopenta[b]pyrrol-2-(1H)-one*

In the same way as described in Example 1, 7.55 grams of m-methoxyphenethylamine and 7.10 grams of cyclopentanone-2-acetic acid are subjected to reductive condensation in 200 ml. ethanol over 1.0 gram 10% palladium on carbon catalyst. The white residue from removal of the catalyst and solvent is slurried in 300 ml. of acetonitrile and the mixture refluxed with stirring for 15 minutes. It is cooled and filtered to give trans-2-carboxymethyl-N-(m-methoxyphenethyl)cyclopentylamine as a pure white solid, M.P. 194–5°.

The acetonitrile filtrate is concentrated to an oil. The oil is dissolved in ether, and the ether washed with a 5% solution of sodium bicarbonate, dried over magnesium sulfate and concentrated to give cis-3,3a,4,5,6,6a-hexahydro - 1 - (m-methoxyphenethyl)cyclopenta[b]pyrrol-2-(1H)-one as an oil.

EXAMPLE 7

*Cis-1,2,3,3a,5,6,11,11a-octahydro-8-methoxybenzo[g]cyclopent[b]indolizinium bromide*

In the same way as described in Example 2, 4.3 grams of cis - 3,3a,4,5,6,6a-hexahydro-1-(m-methoxyphenethyl)cyclopenta[b]pyrrol-2-(1H)-one are cyclized with 15 ml. of phosphorous oxychloride in 100 ml. of benzene to give cis - 1,2,3,3a,5,6,11,11a - octahydro-8-methoxybenzo[g]cyclopent[b]indolizinium bromide as a yellow oil. The quaternary perchlorate is prepared from the bromide, and melts at 121–5° after recrystallization from isopropanol. The free base cis-2,3,3a,5,6,11a-hexahydro-8-methoxy-1H-benzo[g]cyclopenta[b]indolizine is obtained from the salt as described in Example 4, and is a yellow oil.

EXAMPLE 8

*Trans-1,2,3,3a,5,6,11,11a-octahydro-8-methoxybenzo[g]cyclopent[b]indolizinium perchlorate*

A solution of 0.5 gram of trans-2-carboxymethyl-N-(m-methoxyphenethyl) cyclopentylamine in 10 ml. of phosphorous oxychloride is held at 100° for 2 hours, then evaporated to dryness. The oily residue is dissolved in water and 10% perchloric acid is added until precipitation is complete. The pale yellow solid is filtered to give trans - 1,2,3,3a,5,6,11,11a-octahydro-8-methoxybenzo[g]cyclopent[b]indolizinium perchlorate as white needles, M.P. 172–4° after recrystallization from ethanol. The free base, trans-2,3,3a,5,6,11-hexahydro-8-methoxy-1H-benzo[g]cyclopenta[b] indolizine is obtained from the salt as described in Example 2 and is a white solid, M.P. 61–3°.

EXAMPLE 9

*Trans-1,2,3,3a,5,6,11,11a-octahydro-8-hydroxybenzo[g]cyclopent[b]indolizinium bromide*

In the same way as described in Example 6, a solution of 5.0 grams of trans-1,2,3,3a,5,6,11,11a-octahydro-8-methoxybenzo[g]cyclopent[b]indolizinium perchlorate is demethylated with 100 ml. of hydrobromic acid to give trans - 1,2,3,3a,5,6,11,11a-octahydro-8-hydroxybenzo[g]cyclopent[b]indolizinium perchlorate, M.P. >300° after recrystallization from ethanol.

EXAMPLE 10

*Cis-1,2,3,3a,5,6,11,11a-octahydro-8-hydroxybenzo[g]cyclopenta[b]indolizinium bromide*

In the same way as described in Example 6, 4.8 grams of cis - 1,2,3,3a,5,6,11,11a-octahydro-8-methoxybenzo[g]cyclopent[b]indolizinium perchlorate is demethylated with 100 ml. of 48% hydrobromic acid to give cis-1,2,3,3a,5,6,11,11a - octahydro-8-hydroxybenzo[g]cyclopenta[b]indolizinium bromide as white crystals, M.P. 245–6° after recrystallization from acetonitrile.

EXAMPLE 11

2,3,3a,5,6,10b,11,11a-octahydro-8-methoxy-1H-benzo [g] cyclopenta [b] indolizine hydrobromide

A solution 0.5 gram of trans-1,2,3,3a,5,6,11,11a-octahydro-8-methoxybenzo [g] cyclopent [b] indolizinium perchlorate in 50 ml. of methanol is treated with 1.0 gram of potassium borohydride. The mixture is left for 1 hour at ambient temperature, then evaporated to dryness. The residue is partitioned between ether and water. The ether phase is dried over magnesium sulfate and dry hydrogen bromide passed in. The precipitate is filtered to give 2,3,3a,5,6,10b,11,11a-octahydro-8-methoxy-1H-benzo [g] cyclopenta [b] indolizine hydrobromide as a white solid, M.P. 196–9°.

It is to be understood that the foregoing detailed description is given merely by way of illustration and that many variations may be made therein without departing from the spirit of our invention.

Having described our invention, what we desire to secure by Letters Patent is:

1. A compound selected from the group consisting of the stereoisomers and mixtures thereof of compounds represented by the formulae:

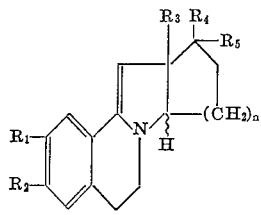

and

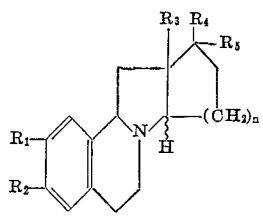

wherein $R_1$ and $R_2$ each is a member selected from the group consisting of hydrogen, hydroxy, and lower alkoxy; $R_3$ is a member selected from the group consisting of hydrogen and lower alkyl; $R_4$ and $R_5$ are each hydrogen and the non-toxic pharmaceutically acceptable salts thereof.

2. 2,3,3a,5,6,10b,11,11a-octahydro-8-methoxy-1H-benzo [g] cyclopenta [b] indolizine.

3. 2,3,3a,5,6,10b,11,11a-octahydro-8-methoxy-11a-methyl-1H-benzo [g] cyclopenta [b] indolizine.

4. 2,3,3a,5,6,10b,11,11a-octahydro-8,9-dimethoxy-11a-methyl-1-carbethoxy-cyclopenta [b] indolizine.

5. 2,3,3a,5,6,10b,11,11a-octahydro-8-hydroxy-1H-benzo [g] cyclopenta [b] indolizine.

6. 2,3,3a,5,6,10b,11,11a-octahydro-8-hydroxy-11a-methyl-1H-benzo [g] cyclopenta [b] indolizine.

7. 2,3,3a,5,6,10b,11,11a-octahydro-8-hydroxy-11a-methyl-1-carboxy-1H-benzo [g] cyclopenta [b] indolizine.

8. 2,3,3a,5,6,10b,11,11a-octahydro-8-methoxy-11a-methyl-1H-benzo [g] cyclopenta [b] indolizine-1-one.

9. 2,3,3a,5,6,10b,11,11a-octahydro-8-hydroxy-11a-methyl-1H-benzo [g] cyclopenta [b] indolizine-1-one.

10. 1,2,3,4,4a,6,7,11b,12,12a-decahydro-9-methoxydibenz [b,g] indolizine.

11. 1,2,3,4,4a,6,7,11b,12,12a-decahydro-9-methoxy-12a-methyl-dibenz [b,g] indolizine.

12. 1,2,3,4,4a,6,7,11b,12,12a-decahydro-9,10-dimethoxy-12a-methyl-1-carbethoxy-dibenz [b,g] indolizine.

13. 1,2,3,4,4a,6,7,11b,12,12a-decahydro-9-hydroxy-dibenz [b,g] indolizine.

14. 1,2,3,4,4a,6,7,11b,12,12a-decahydro-9-hydroxy-12a-methyl-dibenz [b,g] indolizine.

15. 1,2,3,4,4a,6,7,11b,12,12a-decahydro-9-hydroxy-12a-methyl-1-carboxy-dibenz [b,g] indolizine.

16. 1,2,3,4,4a,6,7,11b,12,12a-decahydro-9-methoxy-12a-methyl-dibenz [b,g] indolizine-1-one.

17. 1,2,3,4,4a,6,7,11b,12,12a-decahydro-9-hydroxy-12a-methyl-dibenz [b,g] indolizine-1-one.

18. 2,3,3a,5,6,11a-hexahydro-8-methoxy-1H-benzo [g] cyclopent [b] indolizine.

19. 1,2,3,4,4a,6,7,12a-octahydro-9-methoxydibenz [b,g] indolizine.

20. 2,3,3a,5,6,11a-hexahydro-8-methoxy-1-oxo-11a-methyl-1H-benzo [g] cyclopent [b] indolizine.

21. 1,2,3,4,4a,6,7,12a-octahydro-9-methoxy-1-oxo-12a-methyldibenz [b,g] indolizine.

22. 2,3,3a,5,6,11a-hexahydro-8-methoxy-1-carbethoxy-11a-methyl-1H-benzo [g] cyclopent [b] indolizine.

23. 1,2,3,4,4a,6,7,12a-octahydro-9-methoxy-1-carbethoxy-12a-methyldibenz [b,g] indolizine.

References Cited by the Examiner

UNITED STATES PATENTS

| | | | |
|---|---|---|---|
| 2,877,225 | 3/1959 | Taylor | 260—286 |
| 3,004,031 | 10/1961 | Taylor et al. | 260—286 |
| 3,027,378 | 3/1962 | Stark | 260—286 |
| 3,085,110 | 4/1963 | Young | 260—563 |
| 3,132,147 | 6/1964 | Schopf et al. | 260—289 X |
| 3,156,722 | 11/1964 | Considine et al. | 260—263 |
| 3,159,638 | 12/1964 | Ritchie | 260—289 X |

OTHER REFERENCES

Burger: Medicinal Chemistry, Interscience, 2nd ed. (1960).

Kanaoka: Chem. Pharm. Bull., vol. 7, pp. 595–597 (1959).

ALEX MAZEL, *Primary Examiner.*

HENRY R. JILES, *Examiner.*

DONALD G. DAUS, *Assistant Examiner.*